Feb. 26, 1929.
H. HOUSE
1,703,395
VEHICLE ROOF
Filed Jan. 5, 1926  2 Sheets-Sheet 1
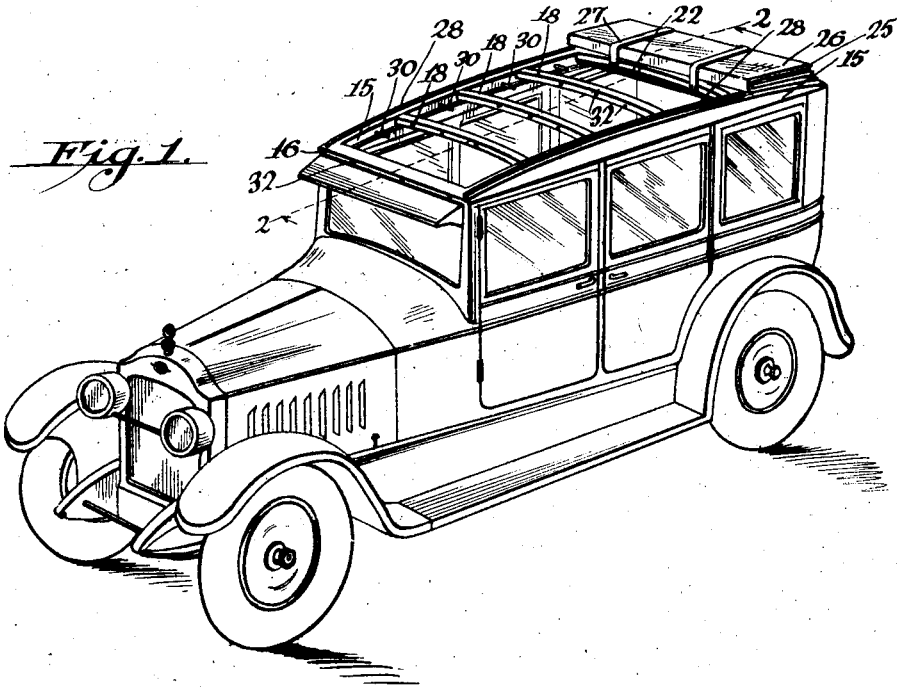
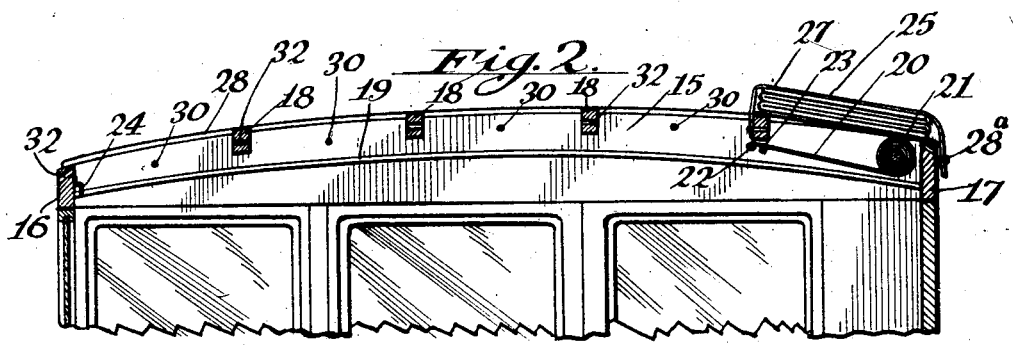
INVENTOR.
Herman House
BY Munn & Co
ATTORNEYS.

Feb. 26, 1929. 1,703,395
H. HOUSE
VEHICLE ROOF
Filed Jan. 5, 1926 2 Sheets-Sheet 2
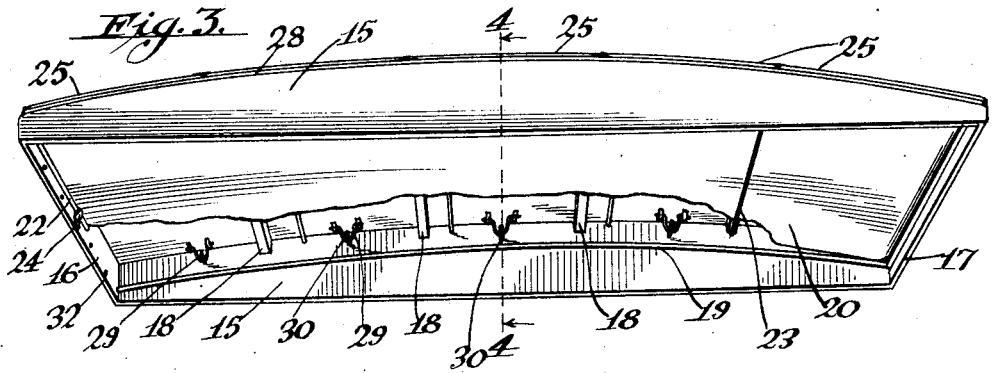
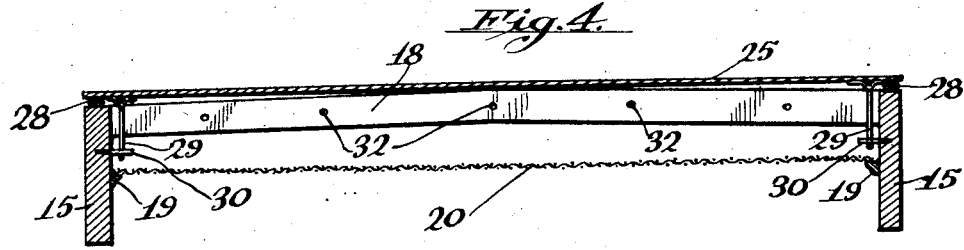
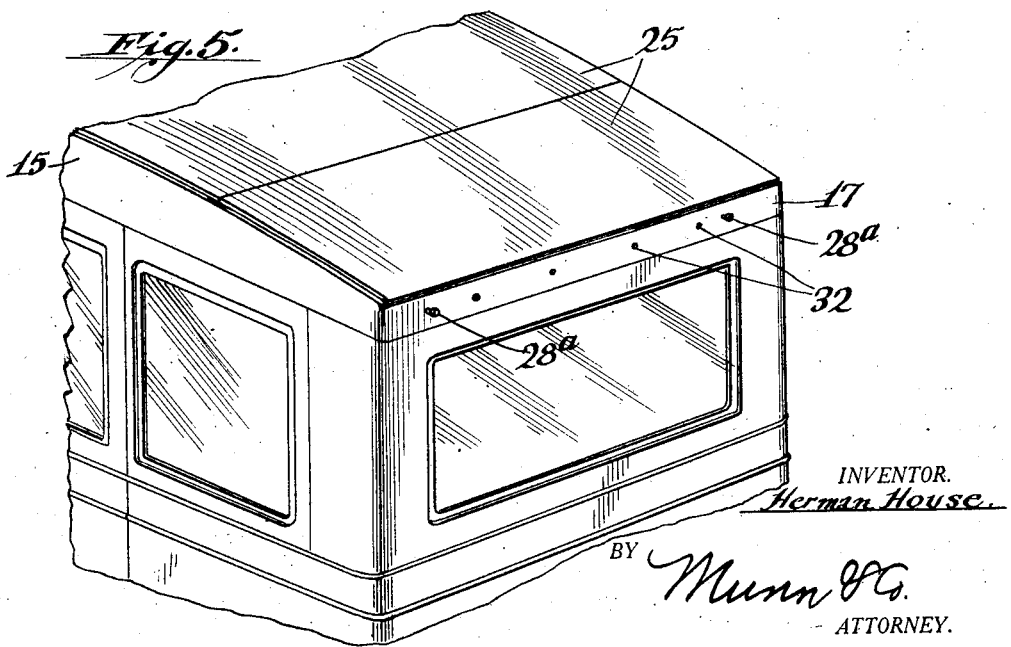
INVENTOR.
Herman House.
BY Munn & Co.
ATTORNEY.

Patented Feb. 26, 1929.

1,703,395

UNITED STATES PATENT OFFICE.

HERMAN HOUSE, OF VANCOUVER, BRITISH COLUMBIA, CANADA.

VEHICLE ROOF.

Application filed January 5, 1926. Serial No. 79,402.

My invention relates to and has for its purpose the provision of a vehicle roof which is capable of being moved to a position in which the entire top of a vehicle body is open to permit a substantially unobstructed view through the top of the vehicle body, and which can be easily closed when required and in a manner to effectively seal the top of the vehicle body against leakages and vibration.

It is also a purpose of my invention to provide a body roof for vehicles having a finishing liner which is flexible to permit winding thereof upon a spring roller when the roof is in open position, but movable to spanning position with respect to the roof so as to be exposed at the inner or under side of the roof to give the highly desired ornamental finish to the roof when in closed position.

A further purpose of my invention is the provision of a vehicle roof of the above described character in which the parts comprising the frame of the roof are formed with ducts through which air may circulate between the roof proper and the finishing liner, whereby heat generated from the sun's rays will not be transmitted to the occupants of the vehicle.

I will describe only one form of vehicle roof embodying my invention, and will then point out the novel features thereof in the claim.

In the drawings

Figure 1 is a view showing in perspective one form of vehicle roof embodying my invention applied to a vehicle;

Figure 2 is a vertical longitudinal sectional view taken on the line 2—2 of Figure 1;

Figure 3 is a detail perspective view of the vehicle roof shown in the preceding views;

Figure 4 is a transverse sectional view taken on the line 4—4 of Figure 3;

Figure 5 is a fragmentary perspective view of the rear end of the vehicle body, with the roof embodying my invention applied thereto.

Similar reference characters refer to similar parts in each of the views of the drawing.

Referring specifically to the drawings, my invention in its present embodiment comprises a roof frame constructed of longitudinal side rails 15 connected at their ends by transverse end rails 16 and 17, and transverse bows 18 extending transversely between the side rails and at regular intervals along the length of the latter.

Secured to the confronting sides of the rails 15 beneath the cross bows 18 are longitudinally extending guiding ribs 19 designed to support and guide a sheet 20 of ornamental flexible material constituting a liner for the roof proper. This liner 20 is wound on a spring roller 21 mounted in the side rails 15 adjacent the rear transverse rail 17. The leading end of the liner carries a rod 22 which functions to maintain the liner as it is unwound from the roller 21 in transversely extended position so that it may be readily drawn forward over a guide rod 23 to the forward end of the roof frame so as to completely span the under side of the frame and to be maintained in such position by the rod 22 engaging a keeper 24 secured to the inner side of the front transverse rail 16. In this position of the liner it is exposed to the inner side of the vehicle body so as to give the desired ornamental finish to the roof, and it will be understood that by virtue of its being interposed between the crossed bows 18 and the guide ribs 19, it will be held against flapping and maintained by virtue of the spring roller 21 in taut position.

The roof proper, or what may be termed the covering, is made up of a plurality of sections 25 constructed of any suitable light and semi-rigid material and covered with a waterproof fabric 26, there being two sheets of this fabric at opposite sides of the sections and secured thereto in such manner as to hingedly connect the several sections to permit of their occupying folded position one upon the other as shown in Figure 1, or an extended position as shown in Figure 3, in which latter position the sections co-operate to completely span the upper side of the roof frame.

In the folded position of the roof sections as shown in Figure 2, they may be securely clamped by means of a pair of strips 27 secured at their forward ends to one of the bows 18, as indicated at 27, and detachably secured at their rear ends by means of fastening members 28ª mounted on the rear transverse rail 17. With the roof sections clamped in this folded position it will be manifest by reference to Figure 1 that the entire top of the vehicle body is open to present a substantially unobstructed view through the top of the vehicle. The roof sections are adapted to be firmly secured in extended position by the provision of separable fasteners associated with the roof sections and frame to permit ready detaching thereof when desiring to move the roof sections to folded position, and yet when in fastening position to draw the roof sections downwardly and into liquid-tight engagement with compressible strips 28 secured to and extending longitudinally along the upper edges of the side rails 15. These strips 28 may be in the form of rubber tubes which, when engaged by the roof sections, are compressed to form a liquid-tight joint between the roof sections and the roof frame. The separable fasteners in the present instance comprise U-shaped members 29 depending from and pivoted on the roof sections and movable to engage or disengage studs 30 extending inwardly from the confronting sides of the side rails 15. In the present instance, I have shown two members 29 for each of the roof sections arranged adjacent their opposite ends, and with the corresponding studs 30 so positioned that when moving the members into engagement therewith the roof sections will be drawn downwardly into firm engagement with the strips 28, as clearly shown in Figure 4.

In warm climates particularly it is highly desirable that some means be provided for dissipating the intense heat usually transmitted through the roof of a closed vehicle body, and to this end, my present invention is constructed to provide ducts or openings 32 in the transverse rails 16 and 17 and the bows 18. It will be understood that the ducts 32 in the front transverse rail 16 will, when the vehicle is in motion, permit currents of air to pass inwardly of the roof between the roof covering and the liner and through the ducts of the bows 18, the air finally discharging from the roof through the ducts of the rear transverse rail 17. In this manner a constant circulation of air through the roof is effected to dissipate the heat and thus prevent its transmission to the occupants of the vehicle. It is to be particularly noted that the ducts in the rails 16 and 17 are inclined downwardly in order to prevent the passage of water therethrough.

Although I have only shown and described one form of vehicle roof embodying my invention, it is to be understood that various minor changes may be made in the construction and operation without departing from the spirit of the invention and the spirit and scope of the appended claim.

I claim:

A vehicle roof comprising a frame including longitudinal side rails connected at their ends by transverse end rails and intermediate their ends by transverse bows, an upper covering for the frame comprising a plurality of sections co-operating when extended to form an uninterrupted roof for the frame and when folded, to expose the frame, co-acting means for securing the sections in roof forming position comprising studs projecting from the side rails and U shaped members pivoted on the sections and engageable with the studs, straps secured at one end to one of the cross bows and adapted to overlie the sections when folded, co-acting means on the straps and frame for clamping the sections in folded position, longitudinally extending guide ribs secured to the confronting sides of the side rails beneath the cross bows, a spring-roller mounted in the side rails adjacent one of the transverse end rails, a liner comprising a sheet of flexible material secured at one end to the spring roller to occupy a rolled up position when it is wound on the roller so as to expose the frame and an extended position beneath the frame wherein it is supported upon said guide ribs and conceals the frame from the occupants of the vehicle, and means for securing the liner in extended position, said transverse end rails having openings through which air is adapted to circulate between the sections and liner when extended, so as to ventilate the roof.

HERMAN HOUSE.